United States Patent [19]

Niederhauser et al.

[11] Patent Number: 5,040,711
[45] Date of Patent: Aug. 20, 1991

[54] LAWN MOWER APPARATUS FOR HOLDING LAWN CARE SUPPLIES

[76] Inventors: Robert D. Niederhauser; Marjorie M. Niederhauser, both of 6856 Rolling Ridge, N. Richland Hills, Tex. 76180

[21] Appl. No.: 515,227

[22] Filed: Apr. 27, 1990

[51] Int. Cl.⁵ .......................... B60R 7/00; B60R 9/00
[52] U.S. Cl. ...................... 224/42.46 R; 224/273; 224/228; 383/22
[58] Field of Search ............... 224/42.46 R, 30 A, 36, 224/277, 273, 0.5, 251, 228, 904, 35, 30 R; 248/205.2; 135/67; 383/11, 22; 280/33.992, DIG. 3, 769, 47.35, 47.38; 16/111 A; 206/DIG. 806, DIG. 831

[56] References Cited

U.S. PATENT DOCUMENTS

| | | | |
|---|---|---|---|
| 1,708,906 | 4/1929 | Sparks et al. | 224/42.46 R |
| 2,326,739 | 8/1943 | Andrews | 224/273 |
| 2,455,119 | 11/1948 | Hall | 224/42.46 R |
| 2,505,323 | 4/1950 | Geiger | 224/42.46 R |
| 2,565,132 | 8/1951 | Kantor | 224/42.46 R |
| 2,582,435 | 1/1952 | Howard | 280/47.38 |
| 2,798,651 | 7/1957 | Wasyluk | 224/273 |
| 3,734,439 | 5/1973 | Wintz | 224/30 A |
| 4,079,871 | 3/1978 | Sica | 224/247 |
| 4,096,978 | 6/1978 | Noice | 224/215 |
| 4,186,859 | 2/1980 | Frankfort | 224/205 |
| 4,240,480 | 12/1980 | Strobel | 383/22 |
| 4,312,393 | 1/1982 | Green | 150/39 |
| 4,339,061 | 7/1982 | Dunn | 224/42.42 |
| 4,339,099 | 7/1982 | Barton et al. | 248/101 |
| 4,512,504 | 4/1985 | Owlett | 224/42.46 R |
| 4,637,534 | 1/1987 | Leppek | 224/36 |
| 4,830,238 | 5/1989 | Widinski | 224/42.46 R |
| 4,859,084 | 8/1989 | Kaumeyer | 383/22 |
| 4,865,240 | 9/1989 | Moreschi | 224/273 |
| 4,948,075 | 8/1990 | Allen | 248/97 |

FOREIGN PATENT DOCUMENTS 1106806  3/1968  United Kingdom .................. 383/22

Primary Examiner—Henry J. Recla
Assistant Examiner—Keith Kupferschmid
Attorney, Agent, or Firm—Henderson & Sturm

[57] ABSTRACT

An apparatus for holding lawn care supplies and/or a beverage in combination with a power lawn mower of a type having a handle extending upwardly and rearwardly therefrom. The handle has a horizontally disposed rear member which is usually the part that the operator grasps during operation of the lawn mower. A container is attached to the horiontally disposed rear member and has compartments for receiving such things as insect spray, weed spray, fertilizer containers and bottles or cans of beverages. A loop is attached to the bottom of the container for attaching a spray bottle thereto which may contain weed killer, insect killer or liquid fertilizer.

3 Claims, 1 Drawing Sheet

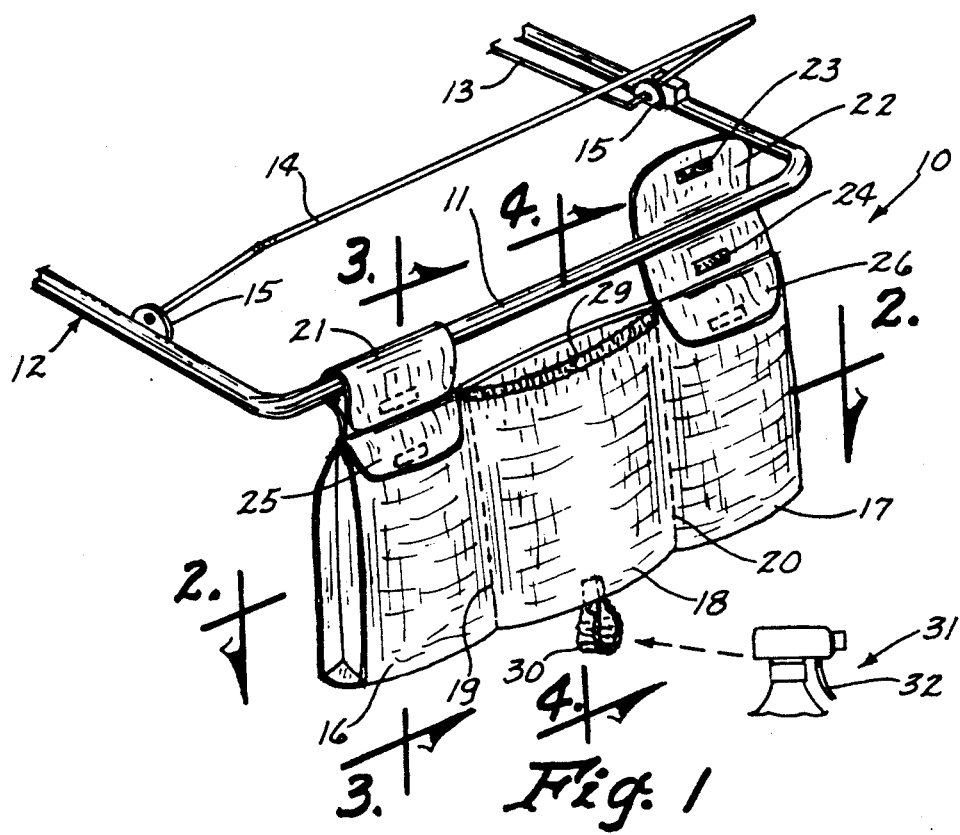
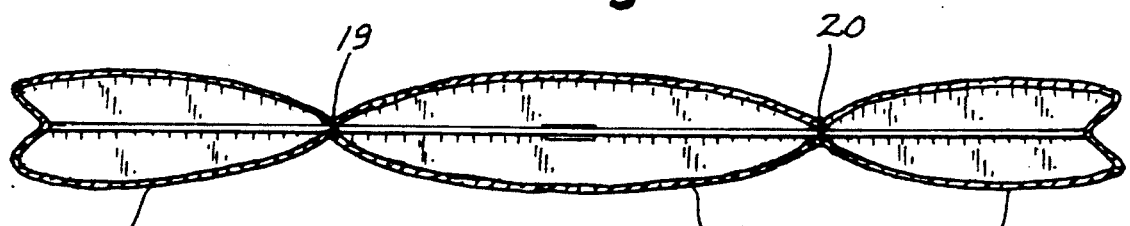
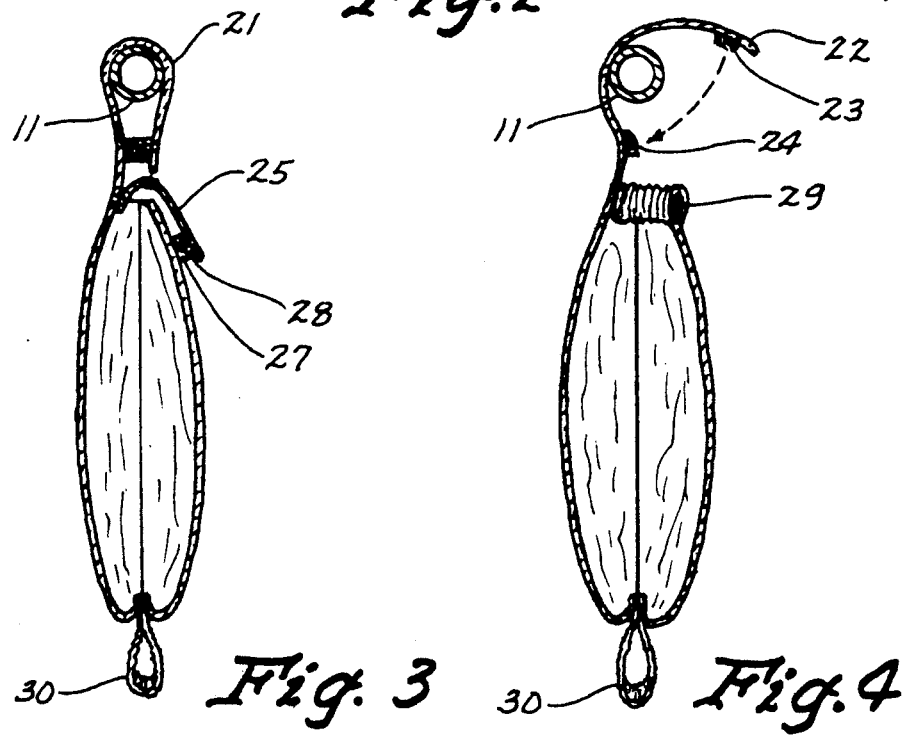

LAWN MOWER APPARATUS FOR HOLDING LAWN CARE SUPPLIES

TECHNICAL FIELD

The present invention relates generally to an attachment for a power lawn mower and more particularly to such an attachment for holding such items as weed killer, insect spray, fertilizer and canned or bottled beverages.

BACKGROUND ART

During the process of mowing a lawn with a power lawn mower, the operator often sees weeds that need to be sprayed, insects, such as ants, that need to be sprayed and certain places where the grass is not growing as well as in other places which could benefit from an additional application of fertilizer in such spots.

Quite often what occurs is that the mower operator finishes the mowing procedure and then goes back and tries to remember where all of the trouble spots were during the mowing process. The operator would then typically first begin with something to spray the weeds, then return with something to spray for insects and then still return again to apply fertilizer. Of course the operator may not do this procedure in that order, but it will be appreciated that it requires the operator to go back and forth between where these supplies are kept and where the work needs to be done. Furthermore, the operator may not remember all of the places that needed attention so certain of these problems may be inadvertently neglected.

Another thing that slows down a lawn mowing process, especially for larger lawns on hot days is that the operator often may want to stop to drink water or some other beverage, and this slows down the process of caring for the lawn.

Consequently, there is a need for an apparatus to help solve the aforementioned problems.

DISCLOSURE OF THE INVENTION

The present invention relates generally to an apparatus for holding lawn care supplies and/or a beverage in combination with a power lawn mower of a type having a handle extending upwardly and rearwardly therefrom. The handle has a horizontally disposed rear member which is usually the part that the operator grasps during operation of the lawn mower. A container is attached to the horizontally disposed rear member and has compartments for receiving such things as insect spray, weed spray, fertilizer containers and bottles or cans of beverages. A loop is attached to the bottom of the container for attaching a spray bottle thereto which may contain weed killer, insect killer or liquid fertilizer.

An object of the present invention is to provide an apparatus for attachment to a power mower for holding such items as containers of weed killer, insect killer, fertilizer, or canned or bottled beverages.

Another object of the present invention is to keep all of the aforementioned types of lawn maintenance items with the lawn mower so that when a problem is located during a lawn mowing process, it can be handled at that time rather than waiting until after the lawn mowing process is completed.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a lawn mower having an apparatus for holding lawn care supplies attached to the handle thereof;

FIG. 2 is a cross sectional view taken along line 2—2 of FIG. 1;

FIG. 3 is a cross sectional view taken along line 3—3 of FIG. 1; and

FIG. 4 is a cross sectional view taken along line 4—4 of FIG. 1.

BEST MODE FOR CARRYING OUT THE INVENTION

Referring now to the drawings wherein like reference numerals designate identical or corresponding parts throughout the several views, FIG. 1 shows an apparatus (10) constructed in accordance with the present invention shown attached to a horizontal handle member (11) of a lawn mower (12). A rod (13) leads down to the engine portion (not shown) of the lawn mower (12) to a cut-off switch. When the handle (14), which is pivotally attached to the lawn mower by flanges (15) is pivoted down and held adjacent to the handle portion (11), the power mower will operate but when the lever (14) is released, it will move to the position shown in solid lines in FIG. 1 which will move the rod (13) and disengage at least the rotary blade of the power mower. It is therefore important that the attachment (10) not interfere with the operation of the cut-off switch handle (14).

The apparatus (10) is constructed of a pliable nylon cloth material similar to that used to construct lawn clipping catcher bags that attach to lawn mowers.

The apparatus (10) has a container divided into compartments (16), (17) and (18) by seams (19) and (20) where the cloth is sewn together. Flaps (21) and (22) have hook and loop fasteners commonly referred to as VELCRO. The hook portion can be sewn onto the flap (22), for example, at portion (23) and the loop portion (24) can be sewn onto another portion of the flap (22) so that they will mesh together in a known fashion. It will of course be understood that the loop portion could be part (23) and the hook portion part (24) of the hook and loop fasteners.

FIG. 3 shows the VELCRO closures in a closed position with the flap (21) around the handle (11) and, when in operation, the flap (22) would also be in such a position. Closure flaps (25) and (26) also are provided for closing compartments (16) and (17) and they can be held closed by VELCRO closures (27) and (28) as is shown in FIG. 3. An elastic piece is sewn into a loop (29) in the top of compartment (18) for allowing the portion (29) to be pulled open and then automatically pulled closed by the elastic member therein. A loop (30) of cloth is sewn into the central bottom portion of compartment (18) as can readily be seen in FIGS. 1-4. This loop can be used for holding a spray bottle (32), for example, by putting the trigger portion (31), of such spray bottle (31) through the loop (30) for example, as shown in dashed lines in FIG. 1.

In operation, when it is desired to use the lawn mower (12) with the apparatus (10) connected thereto, the flaps (21) and (22) are pulled open and then placed around the handle portion (11) as is shown in FIG. 1. Once the VELCRO closures are closed, then containers or sprayers, filled with weed killers, insecticides, or fertilizers, can be placed in each of the compartments (16), (17), and (18). Similarly, cans or bottles of beverages can be placed in any one of the containers (16), (17) and (18). One or more of the compartments can even be insulated to keep cans or bottles of beverages either hot or cold.

When the lawn mower (12) is being utilized, the lever (14) must be pulled down and held against the handle (11) for safety purposes. When the lever (14) is released, it will move back to the position shown in FIG. 1 and either the mower will be shut off or the clutch for the blades disengaged for the safety of the operator.

If, during the process of mowing the lawn, the operator sees weeds that need to be sprayed, the operator can easily and quickly grab the weed killer container out of the apparatus (10) and spray the weeds. If during the process of mowing either before or after that occurs the operator sees an ant hill that is damaging the lawn, the insecticide in the compartments (16), (17) or (18) can be utilized to kill the ants or the like.

If, at another spot on the lawn, it is noticed that the grass is not growing as well as in other places, fertilizer stored in one of the compartments (16), (17) or (18) could be utilized to spot fertilize the lawn at that place.

In addition to placing applicators of weed killer, insecticide or fertilizer in the compartments (16), (17) and (18), a liquid weed killer, liquid insecticide or liquid fertilizer could be stored in the spray dispenser (31) shown in FIG. 1 and stored by placing the trigger through the loop (30), thereby permitting the spray applicator (31) to merely hang down below the compartment (18). This spray container (31) would typically be the container used the most because it is the most readily accessible and the most readily stored.

Accordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. An apparatus for holding lawn care supplies in combination with a power lawn mower having a handle extending upwardly and rearwardly therefrom, said handle having a horizontally disposed rear member; wherein, said apparatus consists of:

a multi-compartmented container having a front panel and a rear panel joined together by a plurality of seams to form a plurality of top compartments in said container; wherein, said plurality of compartments include a compartment formed on each end of said container; wherein said plurality of compartments include at least one compartment disposed intermediate the compartments formed on each end of the container; and, wherein aid at least one compartment is provided with elastic means disposed on the top edge thereof for allowing it to be pulled open but caused it to be biased closed; and flexible attachment flaps formed by extensions of the rear panel of the compartments formed on each end of the container; wherein, said attachment flaps are dimensioned to encircle the said horizontally disposed rear member on said power lawn mower; and releasable fastener means associated with said attachment flaps for forming a loop on each of the attachment flaps to captively encircle said horizontally disposed rear member.

2. The apparatus as in claim 1 wherein at least one of said plurality of compartments is provided with a downwardly depending loop which is operatively attached to the bottom of said at least one of said plurality of compartments.

3. The apparatus as in claim 1 including at least one closure flap associated with at least one of said plurality of open top compartments to selectively open or close the open top of said at least one compartment.

* * * * *